(12) United States Patent
Kamisetty et al.

(10) Patent No.: US 11,552,821 B2
(45) Date of Patent: Jan. 10, 2023

(54) SPANNING TREE PROTOCOL WITH ETHERNET VIRTUAL PRIVATE NETWORK ALL-ACTIVE MULTIHOMING

(71) Applicant: Arista Networks, Inc., Santa Clara, CA (US)

(72) Inventors: Jeevan Kamisetty, San Jose, CA (US); Alton Lo, Fremont, CA (US); Adam Sweeney, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 85 days.

(21) Appl. No.: 17/122,208

(22) Filed: Dec. 15, 2020

(65) Prior Publication Data
US 2022/0191061 A1 Jun. 16, 2022

(51) Int. Cl.
| | |
|---|---|
| *H04L 12/28* | (2006.01) |
| *H04L 7/00* | (2006.01) |
| *H04L 12/947* | (2013.01) |
| *H04L 12/44* | (2006.01) |
| *H04L 12/46* | (2006.01) |

(52) U.S. Cl.
CPC ............ *H04L 12/44* (2013.01); *H04L 12/462* (2013.01); *H04L 12/4641* (2013.01)

(58) Field of Classification Search
CPC ....... H04L 12/44; H04L 12/18; H04L 12/185; H04L 12/4625; H04L 12/4641; H04L 12/462; H04L 12/66; H04L 45/02; H04L 45/16; H04L 45/24; H04L 45/54; H04L 45/745; H04L 49/25; H04L 67/1038

USPC .......................................................... 370/254
See application file for complete search history.

(56) References Cited

U.S. PATENT DOCUMENTS

| | | | |
|---|---|---|---|
| 6,898,189 B1 * | 5/2005 | Di Benedetto | H04L 45/586 370/256 |
| 8,467,316 B1 * | 6/2013 | Goli | H04L 12/4625 370/254 |
| 8,953,590 B1 * | 2/2015 | Aggarwal | H04L 12/1886 370/409 |
| 2007/0206513 A1 * | 9/2007 | Cho | H04L 12/4625 370/254 |
| 2009/0274153 A1 * | 11/2009 | Kuo | H04L 12/66 370/392 |
| 2011/0286452 A1 * | 11/2011 | Balus | H04L 45/00 370/390 |

(Continued)

*Primary Examiner* — Edan Orgad
*Assistant Examiner* — Vanneilian Lalchinthang
(74) *Attorney, Agent, or Firm* — Fountainhead Law Group P.C.

(57) ABSTRACT

Systems and methods are provided herein for supporting Spanning Tree Protocol (STP) in networks that use Ethernet Virtual Private Network (EVPN) All-Active (A-A) multihoming. This may be accomplished by a network administrator defining a super root group comprising a plurality of network devices, wherein each network device provides A-A multihoming to a multihomed device. All network devices in the super root group use a common bridge ID when generating BPDU messages for STP. All network devices in the super root group will send BPDU messages comprising the common bridge ID to the multihomed device. Because the BPDU messages comprise a common bridge ID, the multihomed device treats the network devices in the super root group as a single local bridge, thus STP is enabled without causing STP flapping.

20 Claims, 9 Drawing Sheets

(56) References Cited

U.S. PATENT DOCUMENTS

| | | | |
|---|---|---|---|
| 2012/0243442 A1* | 9/2012 | Musku | H04L 45/22 |
| | | | 370/256 |
| 2013/0235876 A1* | 9/2013 | Sajassi | H04L 41/12 |
| | | | 370/400 |
| 2014/0247754 A1* | 9/2014 | Venkata | H04L 45/48 |
| | | | 370/256 |
| 2018/0006995 A1* | 1/2018 | Bickhart | H04L 12/4625 |
| 2018/0034648 A1* | 2/2018 | Nagarajan | H04L 45/745 |
| 2020/0177402 A1* | 6/2020 | Mishra | H04L 45/16 |

* cited by examiner

SPANNING TREE PROTOCOL WITH ETHERNET VIRTUAL PRIVATE NETWORK ALL-ACTIVE MULTIHOMING

BACKGROUND

The present disclosure relates to supporting Spanning Tree Protocol (STP) in networks that use Ethernet Virtual Private Network (EVPN) All-Active (A-A) multihoming.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
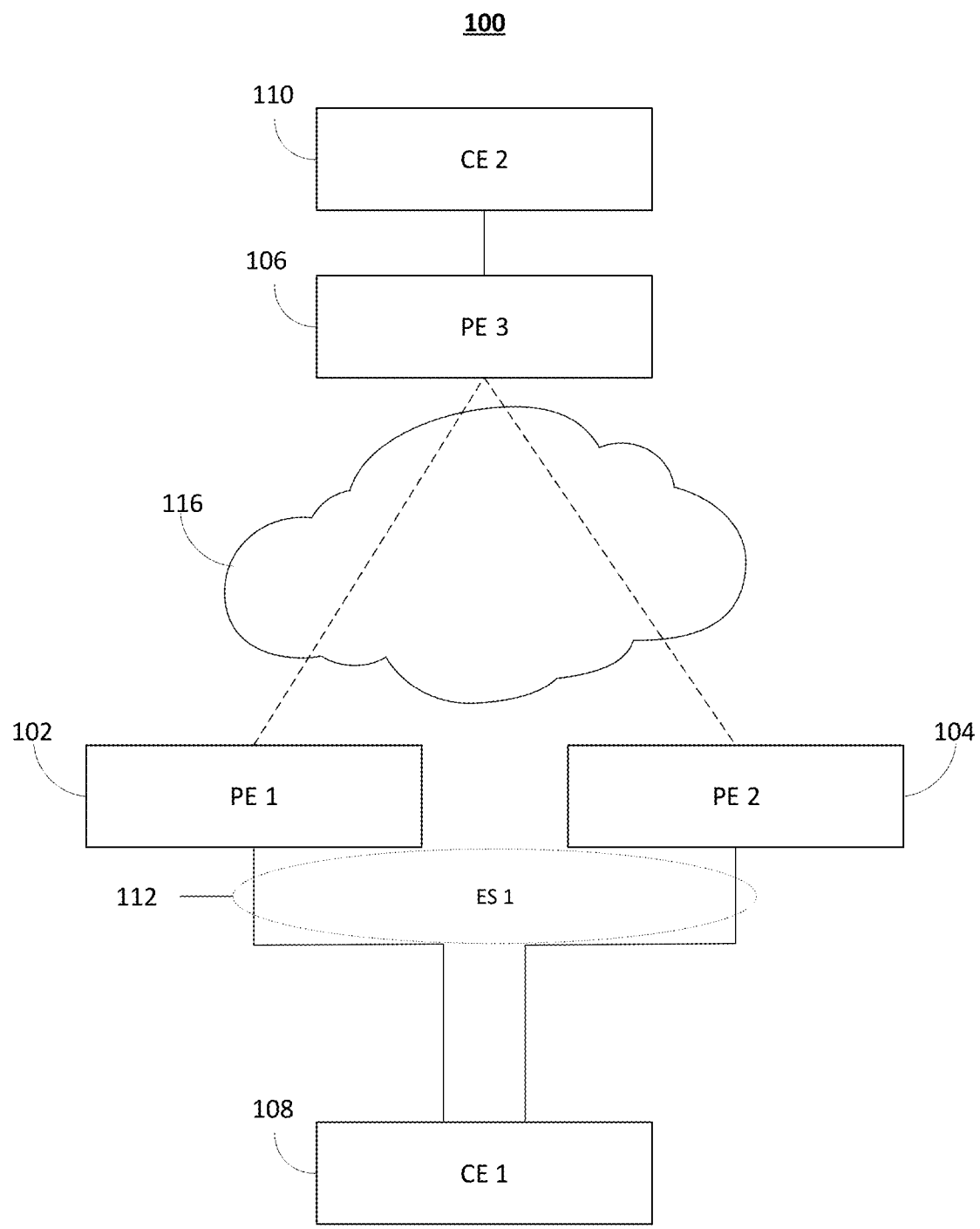
FIG. 1 shows an illustrative network topology of a system for supporting STP in a network using EVPN A-A multihoming, in accordance with some embodiments of the disclosure.

In some computer networks, network devices, such as routers, switches, etc., are configured in multihoming topologies, where two or more network devices provide an active redundant connection to a multihomed device. In an Ethernet Virtual Private Network (EVPN), the various direct connections between a multihomed device and the redundant network devices (e.g., Provider Edge devices (PEs)) are referred to as ethernet segments (ES) and are assigned ethernet segment identifiers (ESIs). In an EVPN, when all PEs attached to an ES are allowed to forward traffic to and from the ES for a given virtual local area network (VLAN), then the ES is defined to be operating in an All-Active (A-A) redundancy mode. Networks that use EVPN A-A multihoming (e.g., networks that comprise one or more ESs operating in an A-A redundancy mode) increase throughput and provide redundancy in a case where a link in an equal cost segment group goes down.

Currently, networks using EVPN A-A multihoming lack efficient methods for addressing Layer 2 (L2) loops. L2 loops occur in networks when there is more than one L2 path between two endpoints. L2 loops can cause adverse effects on a network (e.g., inefficient consumption of bandwidth and resources), so it is often necessary to eliminate L2 loops from the network topology. A common approach for eliminating L2 loops in a non-multihomed EVPN is deploying STP. In a non-multihomed EVPN, STP eliminates L2 loops by reducing the network to a single spanning tree having a single path between endpoints. To accomplish this, STP designates a network device as a root bridge and causes all the other network devices to determine the best route for forwarding data packets to the root bridge. The network devices communicate with their neighbors using Bridge Protocol Data Unit (BPDU) messages, where the BPDU messages comprise, among other things, bridge IDs that are derived using the source Media Access Control (MAC) addresses of the network devices. The network devices use the received BPDU messages to determine the best route to the root bridge and block other redundant links. Networks using EVPN A-A multihoming, however, do not support STP. One reason STP is not supported in networks using EVPN A-A multihoming is because each PE providing A-A multihoming to a multihomed device operates independently, as there is no peer link exchange state related to STP. For example, each PE independently sends a different BPDU message to a multihomed device. Each BPDU message has a different bridge ID because each PE has a different source MAC address. When the multihomed network device receives different BPDU messages from each PE providing multihoming to the multihomed device, the STP process breaks down (e.g., STP flapping occurs). Accordingly, current techniques lack an efficient methodology for supporting STP in a network using EVPN A-A multihoming.

Various systems and methods described herein address these problems by providing a method for supporting STP in a network using EVPN A-A multihoming by establishing a super root using a common bridge ID. To enable STP in a network using EVPN A-A multihoming, a network administrator defines a super root group comprising a plurality of network devices, wherein each network device provides A-A multihoming to a multihomed device using an ES. All network devices in the super root group use a common bridge ID when generating BPDU messages. The bridge ID may be inputted by the network administrator or provided by software implemented on the network devices of the super root group. In some embodiments, the bridge ID is the concatenation of the bridge priority and the source MAC address. All network devices in the super root group will send BPDU messages comprising the common bridge ID to the multihomed device. Because the BPDU messages comprise a common bridge ID, the multihomed device treats the network devices in the super root group as a single local bridge. For example, in an EVPN, a first network device and second network device each provide A-A multihoming to a multihomed device through an ES. When the super root group includes the first network device and the second network device, the first network device sends a first BPDU message to the multihomed device and the second device sends a second BPDU message to the multihomed device. The multihomed device treats the first and second devices as a single bridge because the received first and second BPDU messages comprise the same bridge ID, thus STP is enabled without causing STP flapping.

Although STP is described, the systems and methods described herein can also be used with Rapid Spanning Tree Protocol (RSTP), Multiple Spanning Tree Protocol (MSTP), Per-VLAN Spanning Tree (PVST), and/or similar such methodologies as would be apparent to one of ordinary skill in the art.

FIG. 1 shows an illustrative network topology of a system 100 for supporting STP in a network using EVPN A-A multihoming. The system includes network devices (e.g., routers, switches, host) 102, 104, 106, 108 and 110. In some embodiments, links between devices 102, 104, 106, 108 and 110 may be an overlay of virtual links configured over an underlay of physical devices. Although an EVPN environment is shown, the methods described herein may be used in other network configurations that use VPNs, virtual private LAN services (VPLSs), and similar such technologies.

System 100 is shown as having two customer edge (CE) devices: CE 108 and CE 110. System 100 is also shown as having three provider edge (PE) devices: PE 102, PE 104, and PE 106. One skilled in the art would understand that the same techniques described herein may be used by a system containing any number of PE devices, and CE devices servicing any number of ethernet segments. In some embodiments, CE 108 and CE 110 may be servers that serve several virtual machines, each with its own Layer 2 address (e.g., MAC address). For example, CE 108 may include a hypervisor managing multiple virtual machine instances.

In the shown embodiment, PE 102 and PE 104 have direct connections to CE 108 using ethernet segment (ES) links, which are configured with the ESI label ES 1. In some embodiments, PE 102 and PE 104 are eligible to receive network traffic (e.g., network packets) from PE 106 via links across the cloud 116 (e.g., via the backbone of an EVPN system, for example, using interconnected servers such as the internet as the underlay) and forward the network traffic to CE 108 via ES 112. As mentioned, the illustrated links across the cloud 116 and/or ES 112 may be an EVPN overlay configured over an underlay of physical devices. PE 102 and PE 104 may also receive network traffic from CE 108 via ES 112 and forward the network traffic to PE 106 via links across the cloud 116.

In an embodiment, PE 102 and PE 104 are providing A-A multihoming to CE 108 using ES 112. To begin using STP, a root bridge must be elected within system 100. To elect a root bridge, each interconnected device exchanges bridge IDs using BPDU messages, and whichever device has the lowest bridge ID value is elected the root bridge. In some embodiments, the bridge ID is the concatenation of the bridge priority and the source MAC address. In some embodiments, a network administrator defines a super root comprising PE 102 and PE 104. All network devices in the super root (PE 102 and PE 104) use a common bridge ID when generating BPDU messages. The bridge ID may be inputted by the network administrator or provided by software implemented on the network devices of the super root group. To ensure the network devices in the super root (PE 102 and PE 104) are elected as the root bridge, the bridge ID will be the lowest permitted bridge ID in the network (e.g., bridge priority of 0). In this embodiment, the common source MAC address is defined as "0.0.1" and the common priority is defined as "0," but other values can be used. In some embodiments, the lowest permitted bridge ID is the bridge ID used by the network devices of the super root. The lowest permitted bridge ID value may be any value as long as the value is the lowest bridge ID used in the network. This ensures that the devices in the super root will be elected as the root bridge over all other devices in the network because the super root bridge ID will be the lowest permitted bridge ID. Accordingly, PE 102 generates a first BPDU message comprising the source MAC address of 0.0.1 and priority of 0. PE 104 generates a second BPDU message comprising the source MAC address of 0.0.1 and priority of 0. PE 102 and PE 104 send the first and second BPDU messages to CE 108. CE 108 receives the first and second BPDU messages from PE 102 and PE 104 and treats PE 102 and PE 104 as a single local switch, because the first and second BPDU messages comprise the same source MAC address and priority. CE 108 also recognizes PE 102 and PE 104 as the elected root bridge because the received BPDU messages indicate that PE 102 and PE 104 have the lowest submitted bridge ID. CE determines that PE 102 and PE 104 are a super root, and STP is enabled for system 100.

Figure 2A:
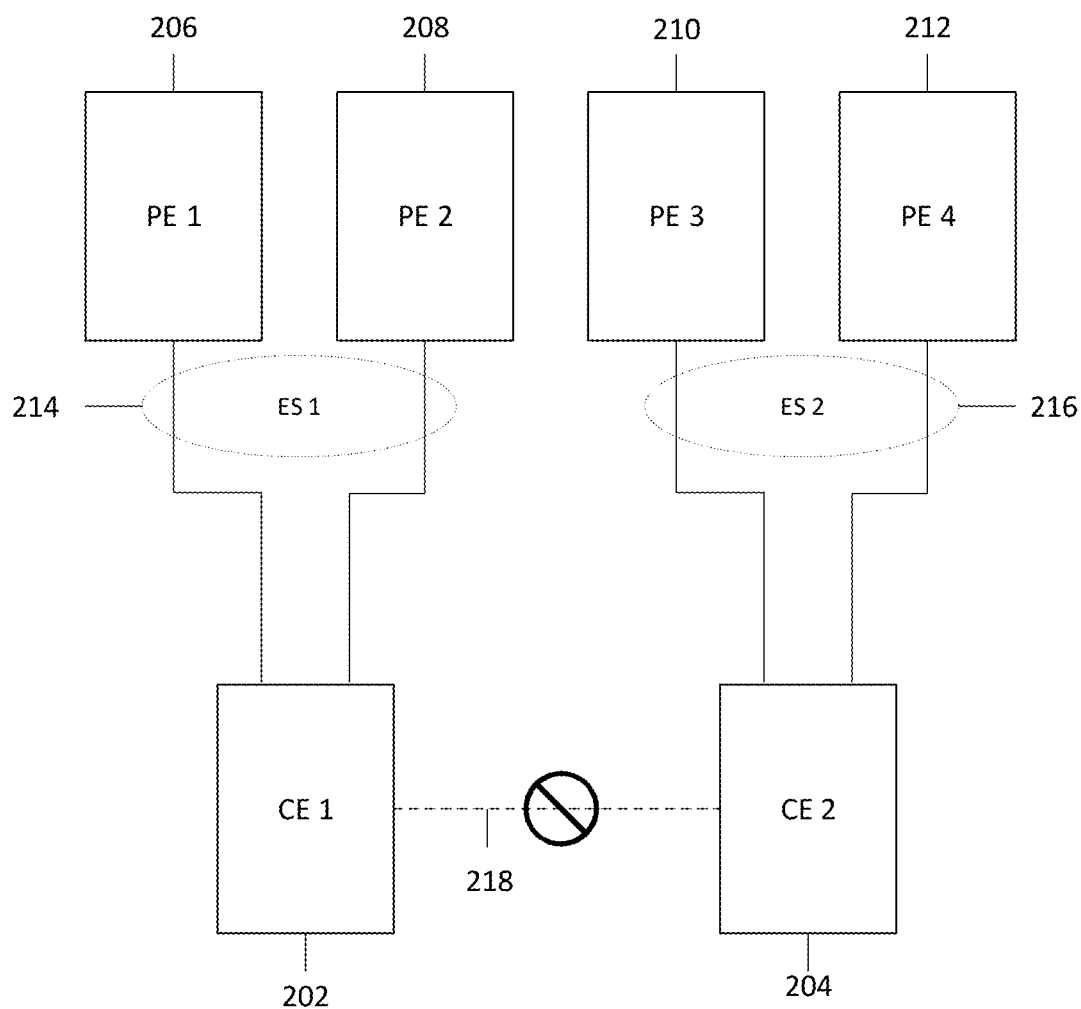
FIG. 2A shows another illustrative network topology of a system for supporting STP in a network using EVPN A-A multihoming, in accordance with some embodiments of the disclosure.

FIG. 2A shows an illustrative network topology of a system 200 for supporting STP in a network using EVPN A-A multihoming. The system includes network devices 202, 204, 206, 208, 210 and 212. In some embodiments, links between devices 202, 204, 206, 208, 210, 212 may be an overlay of virtual links configured over an underlay of physical devices. Although an EVPN environment is shown, the methods described herein may be used in other network configurations that use VPNs, VPLSs, and similar such technologies.

System 200 is shown as having two customer edge (CE) devices: CE 202 and CE 204. System 200 is also shown as having four PE devices: PE 206, PE 208, PE 210, and PE 212. One skilled in the art would understand that the same techniques described herein may be used by a system containing any number of PE devices, and CE devices servicing any number of ethernet segments. As discussed above, CE 202 and CE 204 may be servers that serve several virtual machines, each with its own Layer 2 address (e.g., MAC address). For example, CE 202 may include a hypervisor managing multiple virtual machine instances.

In some embodiments, system 200 may comprise some of the same devices and links shown in system 100, for example, PE 206 and PE 208 may correspond to PE 102 and PE 104 while CE 202 reflects CE 108. In the shown embodiment, PE 206 and PE 208 have direct connections to CE 202 using ES links, which are configured with the ESI label ES 1. In the shown embodiment, PE 210 and PE 212 have direct connections to CE 204 using ES links, which are configured with the ESI label ES 2. In some embodiments, PE 206, PE 208, PE 210 and PE 212 are eligible to receive network traffic (e.g., network packets) via links across a cloud (e.g., via the backbone of an EVPN system, for example, using interconnected servers such as the internet as the underlay) and forward the network traffic to CE 202 and CE 204. In some embodiments, PE 206, PE 208, PE 210 and PE 212 are used as virtual tunnel endpoints (VTEPs). PE 206, PE 208, PE 210, and PE 212 may also receive network traffic from CE 202 and CE 204 via ES 214 and ES 216, respectively, and forward the network traffic across the cloud (not shown).

In an embodiment, PE 206 and PE 208 are providing A-A multihoming to CE 202 using ES 214, and PE 210 and PE 212 are providing A-A multihoming to CE 204 using ES 216. In some embodiments, STP begins with an election of a root bridge in system 200. As discussed above, to elect a root bridge, each interconnected device exchanges bridge IDs using BPDU messages, and whichever device has the lowest bridge ID value is elected the root bridge. In some embodiments, a network administrator defines a super root comprising PE 206, PE 208, PE 210, and PE 212. All network devices in the super root (PE 206, PE 208, PE 210, and PE 212) use a common bridge ID when generating BPDU messages. To ensure the network devices in the super root (PE 206, PE 208, PE 210 and PE 212) are elected as the root bridge, the bridge ID will be lowest (e.g., bridge priority of 0). The bridge ID may be inputted by the network administrator or provided by software implemented on the network devices of the super root group. In some embodiments, after receiving a BPDU from another network device (not shown), the super root may determine that the other network device has a bridge ID that is lower than the bridge ID of the super root. In some embodiments, the super root uses a route guard and/or disable message to disable the link used by the other network device for the STP process ensuring the super root is the elected root.

In some embodiments, the common source MAC address is defined as "0.0.1" and the common priority is defined as "0." During the root bridge election CE 202 exchanges BPDU messages with PE 206, PE 208 and CE 204. Because PE 206 and PE 208's BPDU messages comprise the lowest bridge ID (source MAC address of 0.0.1 and priority as 0), CE 202 determines that PE 206 and PE 208 are the root bridge. CE 202 treats PE 206 and PE 208 as a single bridge because the received BPDU messages comprise the same bridge ID. During the root bridge election CE 204 exchanges BPDU messages with PE 210, PE 212 and CE 202. Because PE 210 and PE 212's BPDU messages comprise the lowest bridge ID (source MAC address of 0.0.1 and priority as 0), CE 204 determines that PE 210 and PE 212 are the root bridge. CE 204 treats PE 210 and PE 212 as a single bridge because the received BPDU messages comprise the same bridge ID. In some embodiments, CE 202 and CE 204 treat all network devices in the super root (PE 206, PE 208, PE 210 and PE 212) as a single bridge because the received BPDU messages comprise the same bridge ID.

After the super route has been elected, each interconnected device exchanges new BPDU messages comprising the elected root bridge (super root PE 206, PE 208, PE 210, and PE 212) and the path cost to the root bridge. The path cost is an STP metric used to calculate the shortest path to the elected root bridge. For example, in PE 206's new BPDU message to CE 202 the path cost is zero because the path cost to itself (the elected root bridge) is nothing. In CE 202's new BPDU message the path cost would be larger (e.g., 7) because network traffic would have to pass from CE 202 through ES 214 to arrive at the elected root bridge (PE 206 and/or PE 208). In some embodiments, CE 204's new BPDU message comprises a path cost (e.g., 8) because network traffic would have to pass from CE 204 through ES 216 to arrive at the elected root bridge (PE 210 and/or PE 212).

In some embodiments, after each interconnected device exchanges new BPDU messages comprising the path costs, each network device determines how to classify its ports. All devices of the super root (PE 206, PE 208, PE 210, and PE 212) classify their ports as designated ports because the devices of the super root are the elected root bridge. In some embodiments, a designated port is a non-root port that is permitted to forward traffic. CE 202 determines that the CE 202 port using ES 214 is a root port because it has the shortest path cost to the bridge. CE 204 determines that the CE 204 port using ES 216 is a root port because it has the shortest path cost to the bridge. Both/either CE 202 and/or CE 204 will determine that their port using link 218 is a blocked port to eliminate L2 loops and enable STP. In some embodiments, CE 202 and/or CE 204 will determine that their port using link 218 is an alternate port or backup port.

Figure 2B:
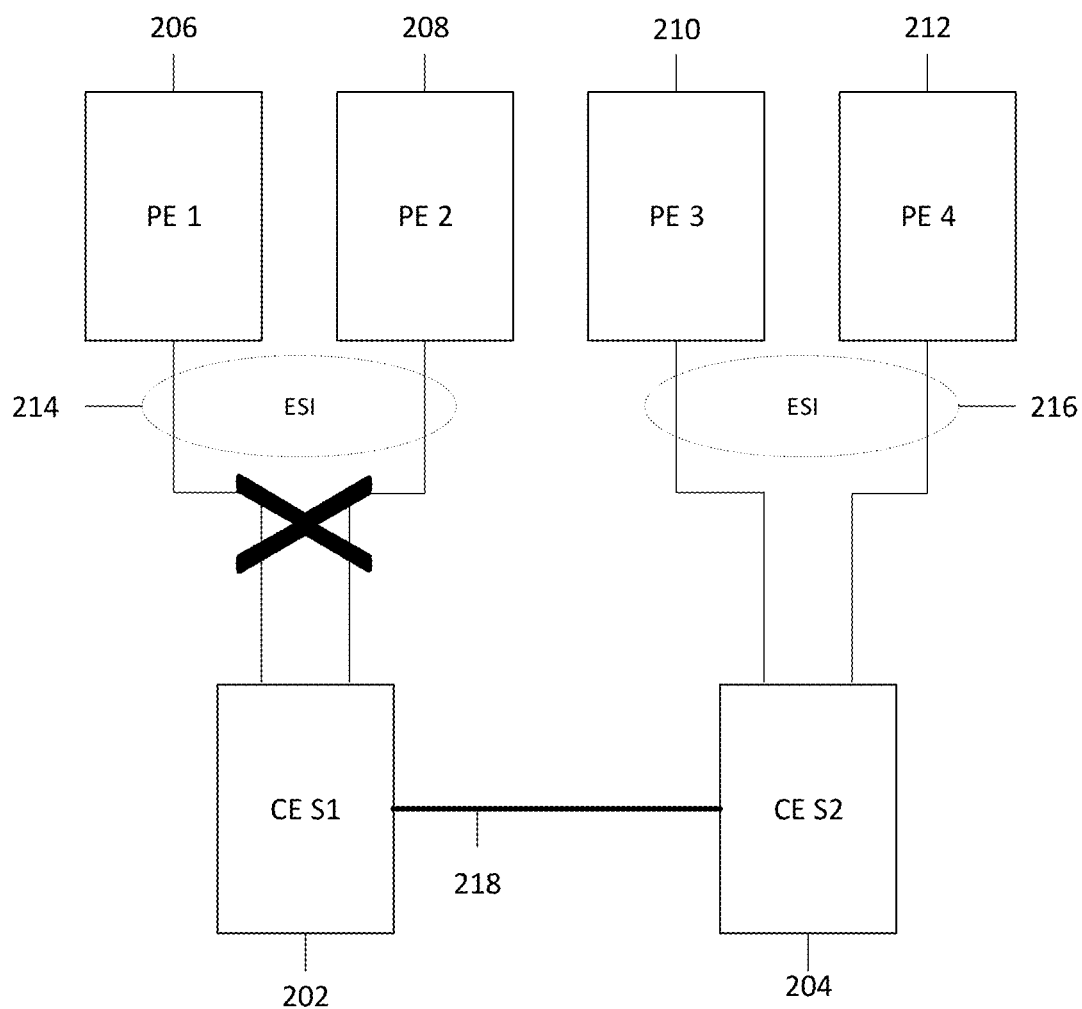
FIG. 2B shows another illustrative network topology of a system for supporting STP in a network using EVPN A-A multihoming, in accordance with some embodiments of the disclosure.

FIG. 2B shows an illustrative network topology of a system 250 for supporting STP in a network using EVPN A-A multihoming. The system includes devices 202, 204, 206, 208, 210, and 212, and the devices have gone through the STP deployment process as discussed above in FIG. 2A. System 250 may have the same devices and links as shown in system 200 except the links between CE 202 and the VTEPs (PE 206 and PE 208) are interrupted or down. Such an event can have wide implications in network 250 and will affect traffic flow from CE 202 to PE 206 and PE 208.

In some embodiments, when an ES link becomes broken or down, the devices of system 250 use STP to react to the link failure. In some embodiments, if ES 214 fails, CE 202 will no longer receive BPDU messages from the PE 206 and PE 208 (devices elected as the root bridge). After a period of time (e.g., the end of a BPDU max age timer), CE 202 will change the classification of the port using link 218 and begin routing traffic using link 218. CE 202 can use link 218 to route traffic through CE 204 to PE 210 and PE 212 (devices elected as the root bridge) using ES 216.

Figure 3A:
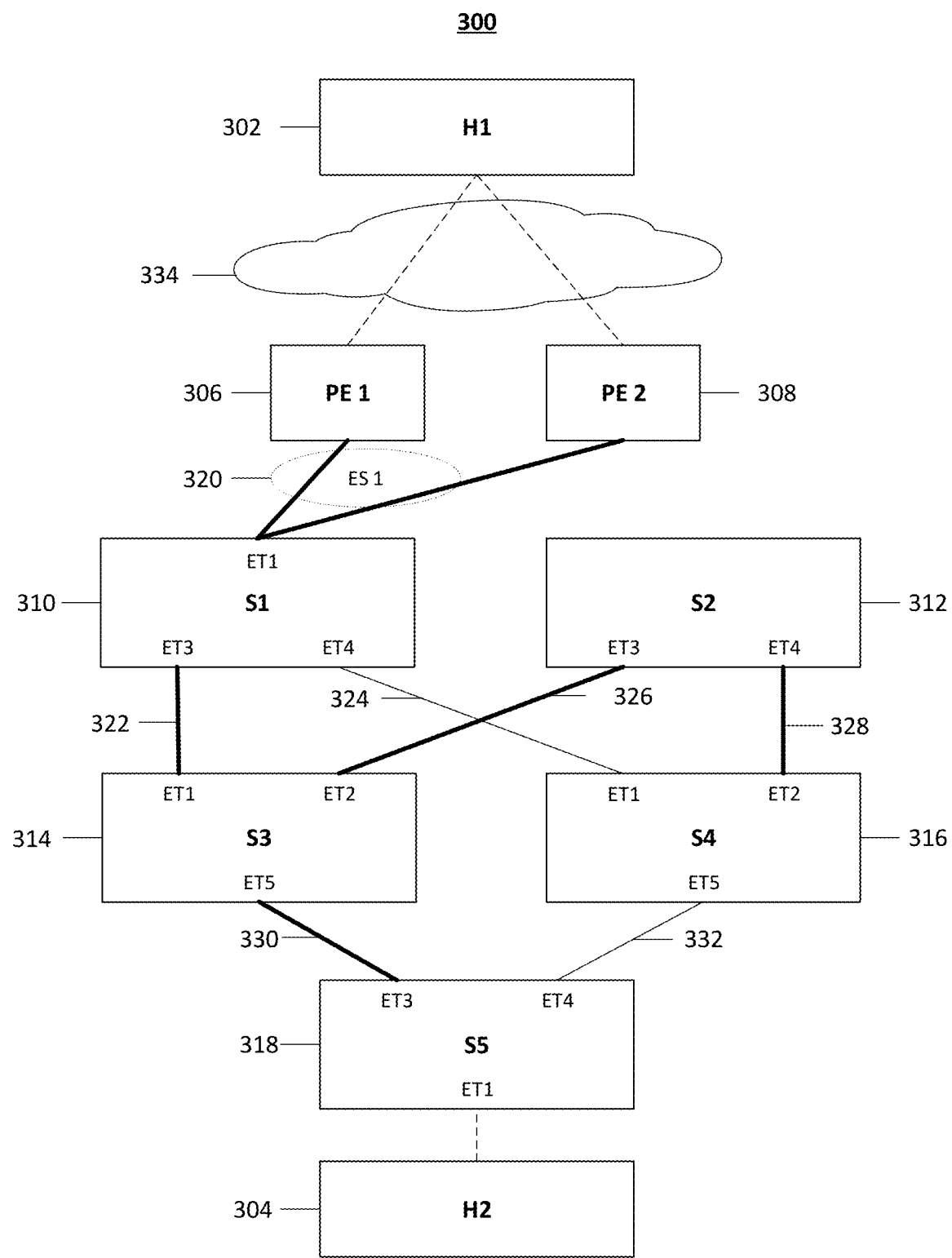
FIG. 3A shows another illustrative network topology of a system for supporting STP in a network using EVPN A-A multihoming, in accordance with some embodiments of the disclosure.

FIG. 3A shows an illustrative network topology of a system 300 for supporting STP in a network using EVPN A-A multihoming. The system includes devices 302, 304, 306, 308, 310, 312, 314, 316, and 318. In some embodiments, links between devices 302, 304, 306, 308, 310, 312, 314, 316, and 318 may be an overlay of virtual links configured over an underlay of physical devices. Although an EVPN environment is shown, the methods described herein may be used in other network configurations that use VPNs, VPLSs, and similar such technologies.

System 300 is shown as having two PE devices (PE 306 and PE 308) that provide A-A multihoming to switch 310. In some embodiments, switch 310 is a CE device. System 300 is shown as having five customer switches: switch 310, switch 312, switch 314, switch 316, and switch 318. System 300 is shown as having two host devices: host 302 and host 304 although any number of host devices may be used. In some embodiments, the hosts are end user devices. In some embodiments, hosts 302 and host 304 may serve several virtual machines, for example host 302 may include a hypervisor managing multiple virtual machine instances. One skilled in the art would understand that the same techniques described herein may be used by a system containing any number of PE devices and CE devices servicing any number of ethernet segments and hosts.

In some embodiments, system 300 may comprise some of the same devices and links shown in system 100, for example, PE 306 and PE 308 may reflect PE 102 and PE 104 while switch 310 reflects CE 108. In the shown embodiment, PE 306 and PE 308 have direct connections to switch 310 using ES links, which are configured with the ESI label ES 1. In some embodiments, PE 306 and PE 308 are eligible to receive network traffic (e.g., network packets) via links across the cloud 334 (e.g., via the backbone of an EVPN system, for example, using interconnected servers such as the internet as the underlay) and forward the network traffic to switch 310. In some embodiments, PE 306 and PE 308 are used as VTEPs. PE 306 and PE 308 may also receive network traffic from switch 310 via ES 320 and forward the network traffic across the cloud 334.

In some embodiments, STP begins with an election of a root bridge in system 300. As discussed above, to elect a root bridge, each interconnected device exchanges bridge IDs using BPDU messages, and whichever device has the lowest bridge ID value is elected the root bridge. In some embodiments, a network administrator defines a super root comprising PE 306 and PE 308. All network devices in the super root (PE 306 and PE 308) use a common bridge ID when generating BPDU messages. To ensure the network devices in the super root (PE 306 and PE 308) are elected as the root bridge, the bridge ID will be lowest (e.g., bridge priority of 0). The bridge ID may be inputted by the network administrator or provided by software implemented on the network devices of the super root group.

In some embodiments, the common source MAC address is defined as "0.0.1" and the common priority is defined as "0." Because PE 306 and PE 308's BPDU messages comprise the lowest bridge ID (source MAC address of 0.0.1 and priority as 0), switch 310, switch 312, switch 314, switch 316, and switch 318 determine that PE 306 and PE 308 are the root bridge. Switch 310, switch 312, switch 314, switch 316, and switch 318 treat PE 306 and PE 308 as a single bridge because PE 306 and PE 308's BPDU messages comprise the same bridge ID.

After the super root has been elected, each interconnected device exchanges new BPDU messages comprising the elected root bridge (super root PE 306 and PE 308) and the path cost to the root bridge. In some embodiments, after each interconnected device exchanges new BPDU messages comprising the path costs, each network device determines how to classify their ports. As shown, all devices of the super root (PE 306 and PE 308) classify its ports as designated ports because the devices of the super root are the elected root bridge. Switch 310 determines that port ET1 of switch 310 using ES 320 is a root port because it has the shortest path to the bridge. The darker lines are links (link 322, link 326, link 328, and link 330) used to route traffic, while lighter lines are links (link 324 and link 332) used as alternate links. In some embodiments, links used to route traffic have a designated port on one side of the link and a root port on the other side of the link. For example, link 322 is used to route traffic between port ET1, a root port, of switch 314 and port ET3, a designated port, of switch 310. In some embodiments, links used as alternative links have a designated port on one side of the link and a blocked port and/or an alternative port on the other side of the link. For example, link 324 is an alternative link and is between port ET4, a designated port, of switch 310 and port ET1, an alternative port, of switch 316. In some embodiments, each network device determines how to classify its ports based on the path cost information exchanged in the BPDU messages ensuring there are no L2 loops.

Figure 3B:
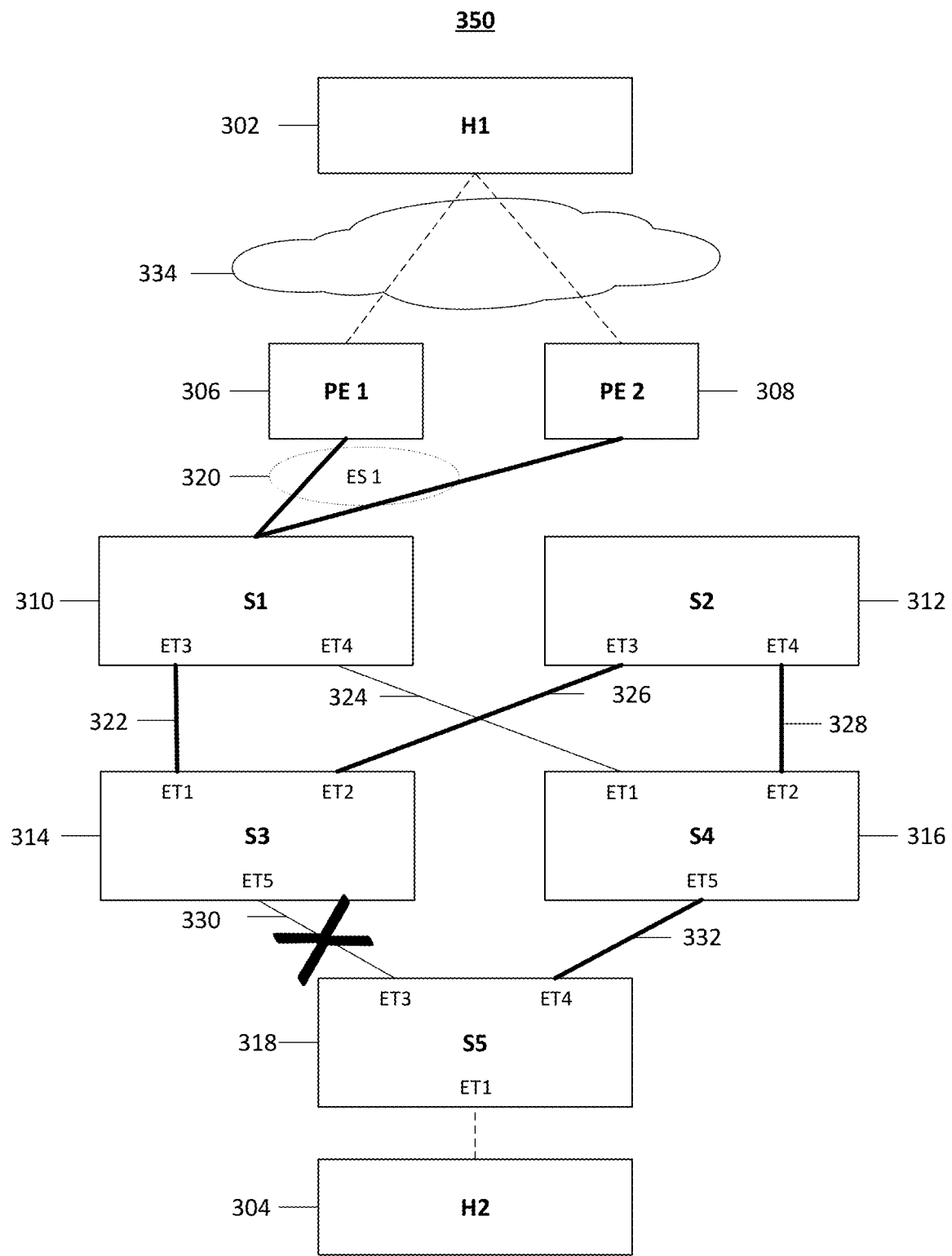
FIG. 3B shows another illustrative network topology of a system for supporting STP in a network using EVPN A-A multihoming, in accordance with some embodiments of the disclosure.

FIG. 3B shows an illustrative network topology of a system 350 for supporting STP in a network using EVPN A-A multihoming. The system includes devices 302, 304, 306, 308, 310, 312, 314, 316, and 318 that have gone through STP and have designated their ports as discussed above in FIG. 3A. System 350 may have the same devices and links as shown in system 300 except the link between switch 314 and switch 318 is interrupted or down. Such an event can have wide implications in network 350 and will affect traffic flow from switch 318 to PE 306 and PE 308 using switch 314.

In some embodiments, when a link becomes broken or down, the devices of system 350 use STP to react to the link failure. In some embodiments, Rapid Spanning Tree Protocol (RSTP), Multiple Spanning Tree Protocol (MSTP), Per-VLAN Spanning Tree (PVST), and/or similar such methodologies may be used. In some embodiments, if link 330 fails, switch 318 will determine that the link is no longer working. In some embodiments, this determination is made after a period of time (e.g., the end of a BPDU max age timer) without receiving a BPDU message. After determining that the link is no longer working, switch 318 reclassifies port ET3 as blocked or alternate and reclassifies port ET4 as a root port. After determining that the link is no longer working, switch 318 sends a topology change (TC) message using port ET4. The TC message will cause a topology change to be propagated throughout system 350. For example, switch 318 sends a TC message to switch 316, which sends a TC message to switch 312, which sends a TC message to switch 314, which sends a TC message to switch 310, which sends a TC message to PE 306 and/or PE 308. In some embodiments, when the root bridge (PE 306 and PE 308) determines that a topology change has occurred, the root bridge sends out TC messages using all interfaces to expedite the topology change. After switch 318 reclassifies port ET3 and port ET4, switch 318 can use link 332 to route traffic to switch 316, which has a path to the root bridge (link 328 to switch 312, link 326 to switch 314, link 322 to switch 310, ES 320 to the root bridge (PE 306 and PE 308). Accordingly, switch 318 establishes a new path to the root bridge (PE 306 and PE 308), and there are no L2 loops in the system before or after the topology change.

Figure 4:
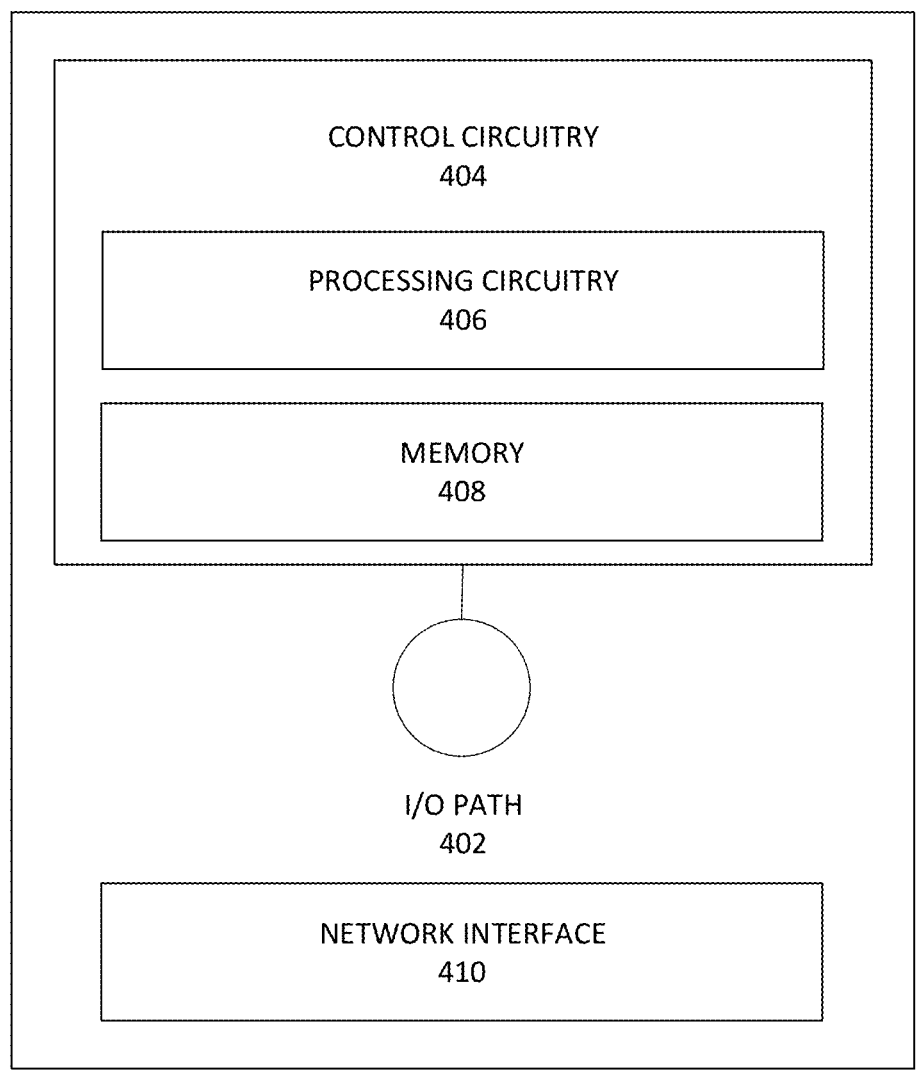
FIG. 4 shows a diagram of an illustrative network device for supporting STP in a network using EVPN A-A multihoming, in accordance with some embodiments of the disclosure.

FIG. 4 shows a generalized embodiment of a network device usable in a system supporting STP in a network using EVPN A-A multihoming, in accordance with some embodiments of the disclosure. In particular, a device 400 of FIG. 4 may be any of the devices depicted in FIGS. 1, 2A, 2B, 3A, and 3B (e.g., devices 102, 104, 106, 108, 110, 202, 204, 206, 208, 210, 212, 302, 304, 306, 308, 310, 312, 314, 316, and 318) or may be a physical or virtual device hosting any of physical or virtual devices 102, 104, 106, 108, 110, 202, 204, 206, 208, 210, 212, 302, 304, 306, 308, 310, 312, 314, 316, and 318. Device 400 may be a router, an L3 switch, an L2 router, or a host, and/or any other computing device that may be configured to participate in EVPN switching or routing. Device 400 may receive data via network interface 410 and provide the received data to control circuitry 404 via an input/output (I/O) path 402. Control circuitry 404 includes processing circuitry 406 and memory 408. Memory 408 may include volatile memory (such as random-access memory (RAM), for example, static RAM and/or dynamic RAM), which does not retain its contents when power is turned off, and non-volatile memory (such as, for example, a solid state drive (SSD), a hard disk drive (HDD), electrically erasable programmable read-only memory (EEPROM), etc.), which does retain its contents when power is turned off. Control circuitry 404 may send and receive commands, requests, and other suitable data using I/O path 402. As noted above, I/O path 402 connects control circuitry 404 (and specifically processing circuitry 406) to network interface 410, which in turn connects device 400 to one or more other devices. For example, I/O path 402 may provide route packets to next hops listed in a forwarding table.

Control circuitry 404 may be based on any suitable processing circuitry, such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 404 executes instructions suitable to implement any of the techniques described above or below.

Memory 408 may be an electronic storage device that is part of control circuitry 404. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. In some embodiments, memory 408 may include a table used for forwarding data packets. Multiple circuits may be provided to handle simultaneous processing functions. In some embodiments, device 400 may be a virtual device, wherein components 404, 406, 408, 402 and 410 are virtualized on top of another physical device.

Figure 5:
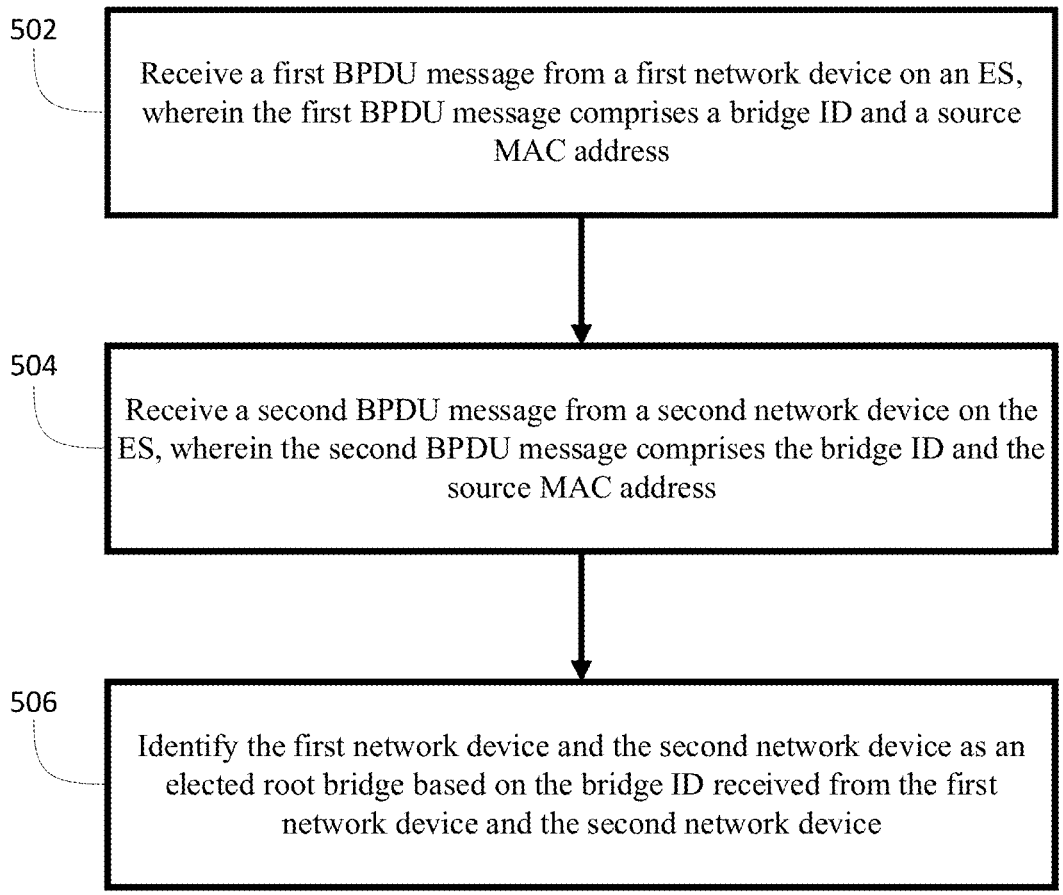
FIG. 5 is a flowchart of an illustrative process for supporting STP in a network using EVPN A-A multihoming, in accordance with some embodiments of the disclosure.

FIG. 5 is a flowchart of a detailed illustrative process for supporting STP in a network using EVPN A-A multihoming, in accordance with some embodiments of the present disclosure. Process 500 may be performed by physical or virtual control circuitry, such as control circuitry 404 of device 400 (FIG. 4). For example, process 500 may be performed by control circuitries of a multihomed device, such as devices 108, 202, 204, and 310. In some embodiments, some steps of process 500 may be performed by one of several devices.

At step 502, control circuitry receives a first BPDU message from a first network device on an ES. In some embodiments, the first network device sends the first BPDU message according to the STP root election process. In some embodiments, the control circuitry determines that the first network device is the elected root bridge based on the first BPDU message. The first BPDU message comprises a bridge ID value, and based on the bridge ID value the control circuitry determines that the first network device is the root bridge. In some embodiments, the root bridge is elected based on the lowest bridge ID value. For example, the control circuitry generates its own bridge ID based on the bridge priority and the source MAC address of the control circuitry. In some embodiments, the control circuitry's bridge ID is inputted by a network administrator or provided by software implemented on the control circuitry. In some embodiments, the control circuitry compares the bridge ID of the control circuitry with the bridge ID of the first BPDU message received from the first network device and determines that the first network device's bridge ID is lower than the control circuitry's bridge ID. Based on this comparison, the control circuitry determines that the first network device is the root bridge.

At step 504, control circuitry receives a second BPDU message from a second network device on the ES. The control circuitry receives the second BPDU message using the same ES that was used to receive the first BPDU message. In some embodiments, the first network device and the second network device provide A-A multihoming to the control circuitry using the ES. The second network device sends the second BPDU message according to the STP root election process. In some embodiments, the second BPDU message comprises the same bridge ID value as the bridge ID value included in the first BPDU message. In some embodiments, the control circuitry receives the first and second BPDU messages at the same time. In some embodiments, the control circuitry sends a third BPDU message to the first and second network devices wherein the third BPDU message comprises the bridge ID associated with the control circuitry.

At step 506, control circuitry identifies the first network device and the second network device as the elected root bridge based on the bridge ID received from the first network device and the second network device being the lowest recorded bridge ID value. In some embodiments, the control circuitry compares the bridge ID of the first network device with the bridge ID of the second BPDU message received from the second network device and determines that the first and second network device's bridge ID are the same. In some embodiments, based on the bridge ID the control circuitry determines that the first network device and the second network device are a single root bridge. Based on the bridge ID of the first and second BPDU message being lower than the bridge ID of the control circuitry, the control circuitry determines that the first and second network devices are a single bridge and the bridge is the elected root bridge. In some embodiments, STP is enabled for the control circuitry. In some embodiments, RSTP, MSTP, or PVST is enabled for the control circuitry. In some embodiments, after the control circuitry determines that the first and second network devices are the elected root bridge, the first device sends a third BPDU message to the first and second network device acknowledging the first and second network devices as the elected root bridge. In some embodiments, the third BPDU message comprises the path cost to the elected root bridge. In some embodiments, the control circuitry sends a fourth BPDU message to other network devices to which it is connected, wherein the other network devices are not the first and second network devices. In some embodiments, the fourth BPDU message comprises the path cost to the elected root bridge.

Figure 6:
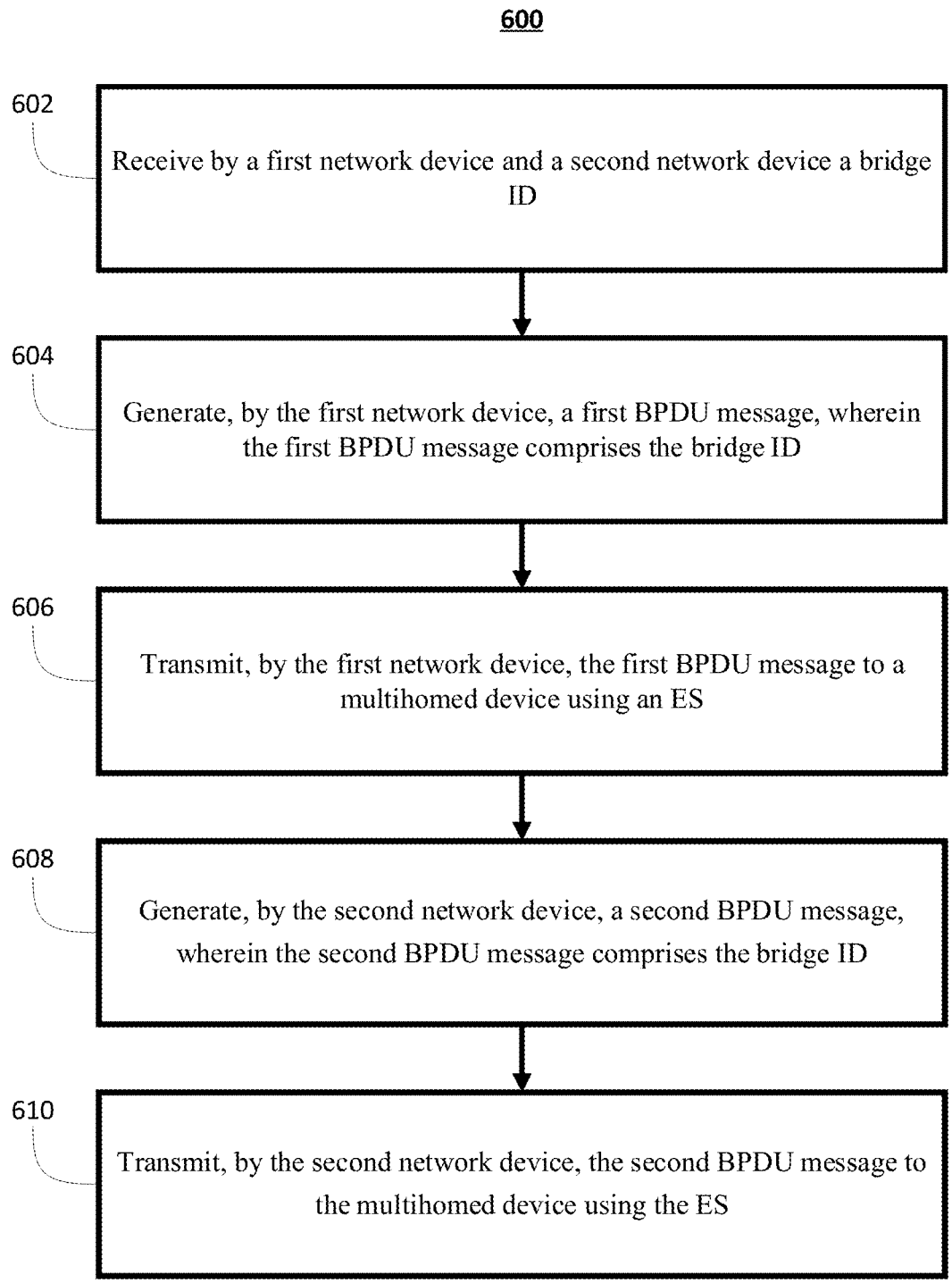
FIG. 6 is another flowchart of an illustrative process for supporting STP in a network using EVPN A-A multihoming, in accordance with some embodiments of the disclosure.

FIG. 6 is a flowchart of a detailed illustrative process for supporting STP in a network using EVPN A-A multihoming, in accordance with some embodiments of the present disclosure. Process 600 may be performed by physical or virtual control circuitry, such as control circuitry 404 of device 400 (FIG. 4). For example, process 600 may be performed by control circuitries of devices providing multihoming, such as devices 102, 104, 206, 208, 210, 212, 306 and 308. In some embodiments, some steps of process 600 may be performed by one of several devices.

At step 602, a first network device and a second network device receive a bridge ID. The bridge ID may be inputted by a network administrator or provided by software implemented on the first network device. In some embodiments, the network administrator selects a number of network devices to be elected as the root bridge for STP, and software on the network devices configure the selected network devices to have a shared bridge ID that ensures the selected network devices are elected as the root bridge. For example, the shared bridge ID may have a priority value of 0 ensuring it is the lowest bridge ID. In some embodiments, the first network device and the second network device provide multihoming to a multihomed device using an ES. In some embodiments, the first and second network devices forward traffic to and from the ES for a given VLAN, where the ES is defined to be operating in an A-A redundancy mode.

At step 604, the first network device generates a first BPDU message, wherein the BPDU message comprises the shared bridge ID and a source MAC address. In some embodiments, the bridge ID is the concatenation of the bridge priority and the source MAC address. In some embodiments, the generation of the BPDU message is in accordance with STP, RSTP, MSTP, or PVST. In some embodiments, the first network device generates the first BPDU message independent of the operational status of a second network device. The operational status can relate to whether the second network device is actively providing multihoming to the multihomed device or is exhibiting a link failure.

At step 606, the first network device transmits the first BPDU message to the multihomed device using the ES, wherein the first BPDU message comprises the bridge ID and source MAC address generated in step 604.

At step 608, the second network device generates a second BPDU message, wherein the BPDU message comprises the same bridge ID and source MAC address as the first BPDU message. In some embodiments, the generation of the BPDU message is in accordance with STP, RSTP, MSTP, or PVST. In some embodiments, the second network device generates the second BPDU message independent of the operational status of the first network device. The operational status can relate to whether the first network device is actively providing multihoming to the multihomed device or is exhibiting a link failure. In some embodiments, the second network device generates and transmits the BPDU message independent of the operational status of the first network device. In some embodiments, the second BPDU message is transferred before or after the first BPDU message. In some embodiments, the second BPDU message is transferred simultaneously with the first BPDU message.

At step 610, the second network device transmits the second BPDU message to the multihomed device using the ES, wherein the second BPDU message comprises the bridge ID and source MAC address generated in step 608. In some embodiments, the first and/or second network device receives a third BPDU message from the multihomed device acknowledging the first and second network devices as the elected root bridge. In some embodiments, the third BPDU message comprises the path cost to the elected root bridge.

Figure 7:
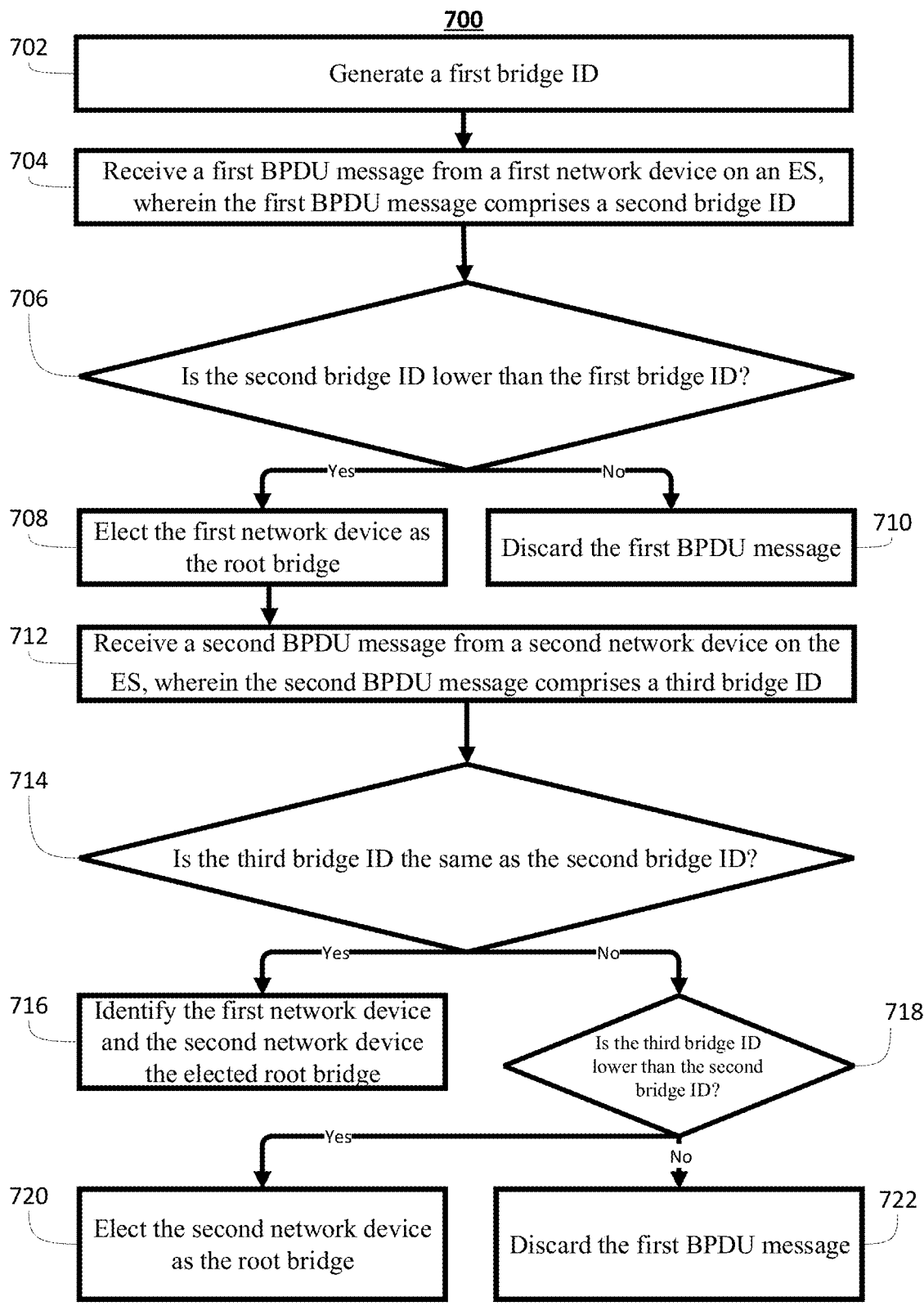
FIG. 7 is another flowchart of an illustrative process for supporting STP in a network using EVPN A-A multihoming, in accordance with some embodiments of the disclosure.

FIG. 7 is a flowchart of a detailed illustrative process for supporting STP in a network using EVPN A-A multihoming, in accordance with some embodiments of the present disclosure. Process 700 may be performed by physical or virtual control circuitry, such as control circuitry 404 of device 400 (FIG. 4). For example, process 700 may be performed by control circuitries of a multihomed device, such as devices 108, 202, 204, and 310. In some embodiments, some steps of process 700 may be performed by one of several devices.

At step 702, control circuitry generates a first bridge ID. In some embodiments, the bridge ID is the concatenation of the bridge priority and the source MAC address. The bridge priority may be some default value or may be configured by a network administrator. The source MAC address is the MAC address associated with the control circuitry. In some embodiments, the generation of the first bridge ID is in accordance with STP, RSTP, MSTP, or PVST.

At step 704, control circuitry receives a first BPDU message from a first network device on an ES, wherein the first BPDU message comprises a second bridge ID. In some embodiments, the first network device sends the first BPDU message according to the STP root election process. In some embodiments, the first network device provides A-A multihoming to the control circuitry using the ES.

At step 706, control circuitry determines if the second bridge ID value is lower than the first bridge ID. In some embodiments, in accordance with STP, the two bridge ID values are compared. If the second bridge ID value is lower than the first bridge ID value, the process continues to step 708. If the second bridge ID value is not lower than the first bridge ID value, the process continues to step 710.

At step 708, control circuitry will elect the first network device as the root bridge. In some embodiments, the second bridge ID has a lower value as a result of a network administrator selecting the first network device as part of a super root group. In some embodiments, the second bridge ID may be a shared bridge ID inputted by the network administrator or provided by software implemented on the network devices of the super root group. To ensure the network devices in the super root (the first network device) are elected as the root bridge, the shared bridge ID will be lower than the first bridge ID (e.g., bridge priority of 0). For example, the common source MAC address may be used by all devices in the super root, and the common priority may be configured to be low (e.g., bridge priority of 0). The process continues with step 712.

At step 710, control circuitry discards the first BPDU message. In some embodiments, because the first bridge ID value is lower than the second bridge ID value, the control circuitry determines that it is the root bridge and the first network device is not the root bridge. In some embodiments, the STP process continues with the control circuitry treating itself like the root bridge.

At step 712, control circuitry receives a second BPDU message from a second network device on the ES, wherein the second BPDU message comprises a third bridge ID. In some embodiments, the second network device sends the second BPDU message according to the STP root election process. In some embodiments, the second network device provides A-A multihoming to the control circuitry using the ES.

At step 714, control circuitry determines if the third bridge ID is the same as the second bridge ID. In some embodiments, in accordance with STP, the second and third bridge ID values are compared. If the third bridge ID value is the same as the second bridge ID value, the process continues to step 716. If the third bridge ID value is not the same as the second bridge ID value, the process continues to step 718.

At step 716, control circuitry identifies the first network device and the second network device as a single root bridge. In some embodiments, the second bridge ID and the third bridge ID have the same bridge ID because they are both part of the super root. In some embodiments, the second bridge ID and third bridge ID are the same as the shared bridge ID inputted by the network administrator or provided by software implemented on the network devices of the super root group. Because the first network device and the second network device share first BPDU and second BPDU messages comprising the same bridge ID and source MAC address, the control circuitry treats the first and second network devices as a single root bridge. Although two network devices are described there can be more than two network devices. For example, if the control circuitry received a third BPDU message from a third network device on the ES, wherein the third BPDU message comprises a fourth bridge ID the control circuitry would make the determination described in step 714. If the fourth bridge ID value is the same as the elected root bridge value then the control circuitry would identify the first network device, the second network device, and the third network device as a single root bridge. If the fourth bridge ID value is not the same as the elected root bridge value, the process continues to step 718. The process 700 starts at step 712 for each subsequent BPDU message received after the first BPDU message.

At step 718, control circuitry determines if the third bridge ID value is lower than the second bridge ID. In some embodiments, in accordance with STP, the two bridge ID values are compared. If the third bridge ID value is lower than the second bridge ID value, the process continues to step 720. If the third bridge ID value is not lower than the second bridge ID value, the process continues to step 722.

At step 720, control circuitry elects the second network device as the root bridge. In some embodiments, because the third bridge ID value is lower than the second bridge ID value, the control circuitry determines that the second network device is the new root bridge and the first network device is no longer the root bridge. In some embodiments, the STP process continues with the control circuitry treating the second network device as the root bridge.

At step 722, control circuitry discards the second BPDU message. In some embodiments, because the second bridge ID value is lower than the third bridge ID value, the control circuitry determines that the first network device is still the root bridge and the second network device is not the root bridge. In some embodiments, the STP process continues with the control circuitry treating the first network device as the root bridge.

The processes 500, 600, and 700 described above are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

It will be apparent to those of ordinary skill in the art that methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A method for eliminating layer 2 network loops using Spanning Tree Protocol (STP) in a multihomed Ethernet Virtual Private Network (EVPN) comprising:
receiving, by a multihomed device, a first Bridge Protocol Data Unit (BPDU) message from a first network device, said first network device having at least two ports, wherein the first BPDU message comprises a bridge identifier (ID) and a source Media Access Control (MAC) address, and the first network device provides multihoming to the multihomed device using an Ethernet Segment (ES);
receiving, by the multihomed device, a second BPDU message from a second network device, said second network device having at least two ports, wherein the second BPDU message comprises the bridge ID and the source MAC address, and the second network device provides multihoming to the multihomed device using the ES;
identifying, by the multihomed device, the first network device and the second network device as an elected root bridge based on the bridge ID received from the first network device and the second network device being a lowest recorded bridge ID value, wherein the first network device and the second network device provide multihoming to the multihomed device, and wherein each port of the at least two ports of the first network device and each port of the at least two ports of the second network device of the elected root bridge are designated root ports;
preventing formation of a loop in the layer 2 network and enabling STP by:
establishing the elected root bridge as a super root using a common bridge ID,
determining a first port of a plurality of ports of the multihomed device as a root port having a shortest path cost to one of the designated root ports of the elected root bridge, and
blocking ports of the plurality of ports of the multihomed device to eliminate layer 2 network loops; and
sending a third BPDU message to the first network device acknowledging the first network device as the elected root bridge, to the second network device acknowledging the second network device as the elected root bridge, or both.

2. The method of claim 1, wherein the first network device and the second network device provide All-Active (A-A) multihoming to the multihomed device.

3. The method of claim 1, further comprising generating the bridge ID of the first BPDU message and the second BPDU message based on a network administrator selecting the first network device and the second network device as the elected root bridge.

4. The method of claim 1, wherein the bridge ID is a lowest permitted network bridge ID.

5. The method of claim 1, wherein the first network device uses Multiple Spanning Tree Protocol (MSTP), Rapid Spanning Tree Protocol (RSTP), or Per-VLAN Spanning Tree Protocol (PVST).

6. An apparatus for eliminating layer 2 network loops using Spanning Tree Protocol (STP) in a multihomed Ethernet Virtual Private Network (EVPN) comprising:
control circuitry; and
at least one memory including computer program code for one or more programs, the at least one memory and the computer program code configured to, with the control circuitry, cause the apparatus to perform at least the following:
receive a first Bridge Protocol Data Unit (BPDU) message from a first network device, wherein the first BPDU message comprises a bridge identifier (ID) and a source Media Access Control (MAC) address, and the first network device provides multihoming to the apparatus using an Ethernet segment (ES), said first network device having at least two ports;
receive a second BPDU message from a second network device, wherein the second BPDU message comprises the bridge ID and the source MAC address, and the second network device provides multihoming to the apparatus using the ES), said second network device having at least two ports;

identify the first network device and the second network device as an elected root bridge based on the bridge ID received from the first network device and the second network device being a lowest recorded bridge ID value, wherein the first network device and the second network device provide multihoming to the apparatus, and wherein each port of the at least two ports of the first network device and each port of the at least two ports of the second network device of the elected root bridge are designated root ports;

prevent formation of a loop in the layer 2 network and enable STP by:
  establishing the elected root bridge as a super root using a common bridge ID,
  determining a first port of a plurality of ports of the apparatus as a root port having a shortest path cost to one of the designated root ports of the elected root bridge, and
  blocking ports of the plurality of ports of the apparatus to eliminate layer 2 network loops; and send a third BPDU message to the first network device acknowledging the first network device as the elected root bridge, to the second network device acknowledging the second network device as the elected root bridge, or both.

7. The apparatus of claim 6, wherein the first network device and the second network device provide All-Active multihoming to the apparatus.

8. The apparatus of claim 6, wherein a network administrator inputs the bridge ID.

9. The apparatus of claim 6, wherein the apparatus is further caused to:
  receive an additional BPDU message from a third network device, wherein the additional BPDU message comprises the bridge ID and the source MAC address, and the third network device provides multihoming to the apparatus using the ES; and
  identify the first network device, the second network device, and the third network device as a single bridge.

10. The apparatus of claim 6, wherein the apparatus uses Rapid Spanning Tree Protocol (RSTP) or Per-VLAN Spanning Tree Protocol (PVST).

11. A method for eliminating layer 2 loops using Spanning Tree Protocol (STP) in a multihomed Ethernet Virtual Private Network (EVPN) comprising:
  generating a first Bridge Protocol Data Unit (BPDU) message by a first network device independent of an operational status of a second network device, wherein the first network device provides multihoming to a multihomed device using an Ethernet segment (ES), said first network device having at least two ports, and the BPDU message comprises a bridge identifier (ID) and a source Media Access Control (MAC) address;
  transmitting the first BPDU message by the first network device to the multihomed device;
  generating a second BPDU message by the second network device independent of an operational status of the first network device, wherein the second network device provides multihoming to the multihomed device using the ES, said second network device having at least two ports, and the second BPDU message comprises the bridge ID and the source MAC address;
  transmitting the second BPDU message by the second network device to the multihomed device, wherein the first BPDU message and the second BPDU message cause the multihomed device to identify the first network device and the second network device as an elected root bridge based on the bridge ID received from the first network device and the second network device being a lowest recorded bridge ID value, wherein each port of the at least two ports of the first network device and each port of the at least two ports of the second network device of the elected root bridge are designated root ports, and
  wherein the bridge ID establishes a super root to prevent a formation of a layer 2 loop and enable STP by:
    determining a first port of a plurality of ports of the multihomed device as a root port having a shortest path cost to one of the designated root ports of the elected root bridge, and
    blocking ports of the plurality of ports of the multihomed device to eliminate layer 2 network loops; and
  sending a third BPDU message to the first network device acknowledging the first network device as the elected root bridge, to the second network device acknowledging the second network device as the elected root bridge, or both.

12. The method of claim 11, further comprising:
  receiving by the first network device, the third BPDU message comprising the bridge ID and the source MAC address; and
  receiving by the second network device, the third BPDU message comprising the bridge ID and the source MAC address.

13. The method of claim 11, wherein the first network device and the second network device provide All-Active (A-A) multihoming to the multihomed device.

14. The method of claim 11, wherein the first network device uses Multiple Spanning Tree Protocol (MSTP), Rapid Spanning Tree Protocol (RSTP), or Per-VLAN Spanning Tree Protocol (PVST).

15. A system for eliminating layer 2 network loops using Spanning Tree Protocol (STP) in a multihomed Ethernet Virtual Private Network (EVPN) comprising:
  a first network device having at least two ports configured to:
    generate a first Bridge Protocol Data Unit (BPDU) message, wherein the first network device provides multihoming to a multihomed device using an Ethernet segment (ES), and the first BPDU message comprises a bridge identifier (ID) and a source Media Access Control (MAC) address; and
    transmit the first BPDU message to the multihomed device;
  a second network device having at least two ports configured to:
    generate a second BPDU message while the first network device is providing multihoming to the multihomed device, wherein the second network device provides multihoming to the multihomed device using the ES, and the second BPDU message comprises the bridge ID and the source MAC address; and
    transmit the second BPDU message to the multihomed device; and
  the multihomed device configured to:
    receive the first BPDU message and the second BPDU message;
    determine that the first network device and the second network device are an elected root bridge based on the bridge ID received from the first network device and the second network device being a lowest recorded bridge ID value, wherein the first network device and the second network device provide multihoming to the multihomed device, wherein each port of the at least two ports of the first network device and each port of the at least two ports of the second network device of the elected root bridge are designated root ports, and wherein the elected root bridge is established as a super root to prevent a formation of a layer 2 loop and STP is enabled; and further wherein the multihomed device:
- determines a first port of a plurality of ports of the multihomed device as a root port having a shortest path cost to one of the designated root ports of the elected root bridge, and
- blocks ports of the plurality of ports of the multihomed device to eliminate layer 2 network loops; and
- sends a third BPDU message to the first network device acknowledging the first network device as the super root, to the second network device acknowledging the second network device as the super root, or both.

16. The system of claim 15, wherein the first network device and the second network device determine the bridge ID and source MAC address based on a network administrator selecting the first network device and the second network device the elected root bridge.

17. The system of claim 15, wherein the first network device and the second network device provide All-Active (A-A) multihoming to the multihomed device.

18. The system of claim 15, further comprising:
a third network device configured to:
- generate an additional BPDU message wherein the third network device provides multihoming to the multihomed device using the ES, and the additional BPDU message comprises the bridge ID and the source MAC address; and
- transmit the additional BPDU message to the multihomed device.

19. The system of claim 15, wherein the first network device is configured to use Spanning Tree Protocol (STP) or Rapid Spanning Tree Protocol (RSTP).

20. The system of claim 15, wherein the first network device is configured to use Multiple Spanning Tree Protocol (MSTP) or Per-VLAN Spanning Tree Protocol (PVST).

* * * * *